(12) United States Patent
Hajje et al.

(10) Patent No.: US 9,559,574 B2
(45) Date of Patent: Jan. 31, 2017

(54) ELECTRIC MOTOR

(71) Applicant: Apparent Energy, Inc., Ashland, OR (US)

(72) Inventors: Hani Henri Hajje, Ashland, OR (US); Brett C. Belan, Ashland, OR (US)

(73) Assignee: Apparent Energy, Inc., Ashland, OR (US)

( * ) Notice: Subject to any disclaimer, the term of this patent is extended or adjusted under 35 U.S.C. 154(b) by 83 days.

(21) Appl. No.: 14/574,159

(22) Filed: Dec. 17, 2014

(65) Prior Publication Data

US 2016/0181962 A1  Jun. 23, 2016

(51) Int. Cl.
*H02P 25/08* (2016.01)
*H02K 21/00* (2006.01)
*H02K 3/52* (2006.01)
*H02K 5/22* (2006.01)
*H02K 15/00* (2006.01)

(52) U.S. Cl.
CPC .............. *H02K 21/00* (2013.01); *H02K 3/522* (2013.01); *H02K 5/225* (2013.01); *H02K 15/0075* (2013.01); *H02P 25/092* (2016.02); *H02K 2203/03* (2013.01)

(58) Field of Classification Search
CPC .............................. H02P 25/08; H02K 19/103
USPC ................................................. 318/254.1, 34
See application file for complete search history.

(56) References Cited

U.S. PATENT DOCUMENTS

| | | | |
|---|---|---|---|
| 3,611,091 A | 10/1971 | Genovese | |
| 4,237,410 A | 12/1980 | Erickson et al. | |
| 4,584,506 A * | 4/1986 | Kaszmann | H02P 25/083 318/400.26 |
| 7,123,821 B1 * | 10/2006 | Hayden | H02K 25/00 388/830 |
| 7,230,396 B1 * | 6/2007 | Martin | H02M 3/158 318/140 |
| 2004/0222756 A1 | 11/2004 | Crookes | |

FOREIGN PATENT DOCUMENTS

WO    9718617 A1    5/1997

OTHER PUBLICATIONS

The Tesla Switch, http://www.icehouse.net/john1/tesla.html, pp. 1-8, Copyright 1996.
OS: Tesla Switch—Geovoltaic Energy Pump (GVE))—PESWiki, pp. 1-8, Last modified Sep. 21, 2008.

* cited by examiner

*Primary Examiner* — David S Luo
(74) *Attorney, Agent, or Firm* — George C. Rondeau, Jr.; Davis Wright Tremaine LLP

(57) ABSTRACT

An electric motor comprises a stator, rotor and powering circuit. A first stator pole is operable to attract a first rotor pole to rotate the rotor when the first stator pole is energized, and a second stator pole is operable to attract a second rotor pole when energized. The circuit comprises a plurality of charge storage devices including a first subset and a second subset which in a first mode of operation is operable to discharge the first subset to both energize the first stator pole and charge the second subset, with the first subset connected in series and the second subset connected in parallel, and in a second mode of operation, the circuit is operable to discharge the second subset to both energize the second stator pole and charge the first subset, with the second subset connected in series and the first subset connected in parallel.

15 Claims, 8 Drawing Sheets

ELECTRIC MOTOR

FIELD OF THE INVENTION

The present invention is related to electric motors and more specifically to a circuit for powering an electric motor and controlling the modes of operation of the electric motor.

BACKGROUND

Electric motors operate to convert electrical energy to mechanical energy, whereby electrical energy that may be provided from a power source, such as a battery, is used to drive a load. In a reluctance motor, for example, the electrical energy is converted to a magnetic field that induces non-permanent magnetic poles on a rotor to generate torque. To ensure that an electric motor is energy-efficient it is important to minimize energy loss during the conversion. For example, certain rotor and stator designs have been demonstrated to be energy-efficient by minimizing energy that is lost during the operation of the motor. Furthermore, the energy efficiency of motors may be improved by configuring other aspects of motor design.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
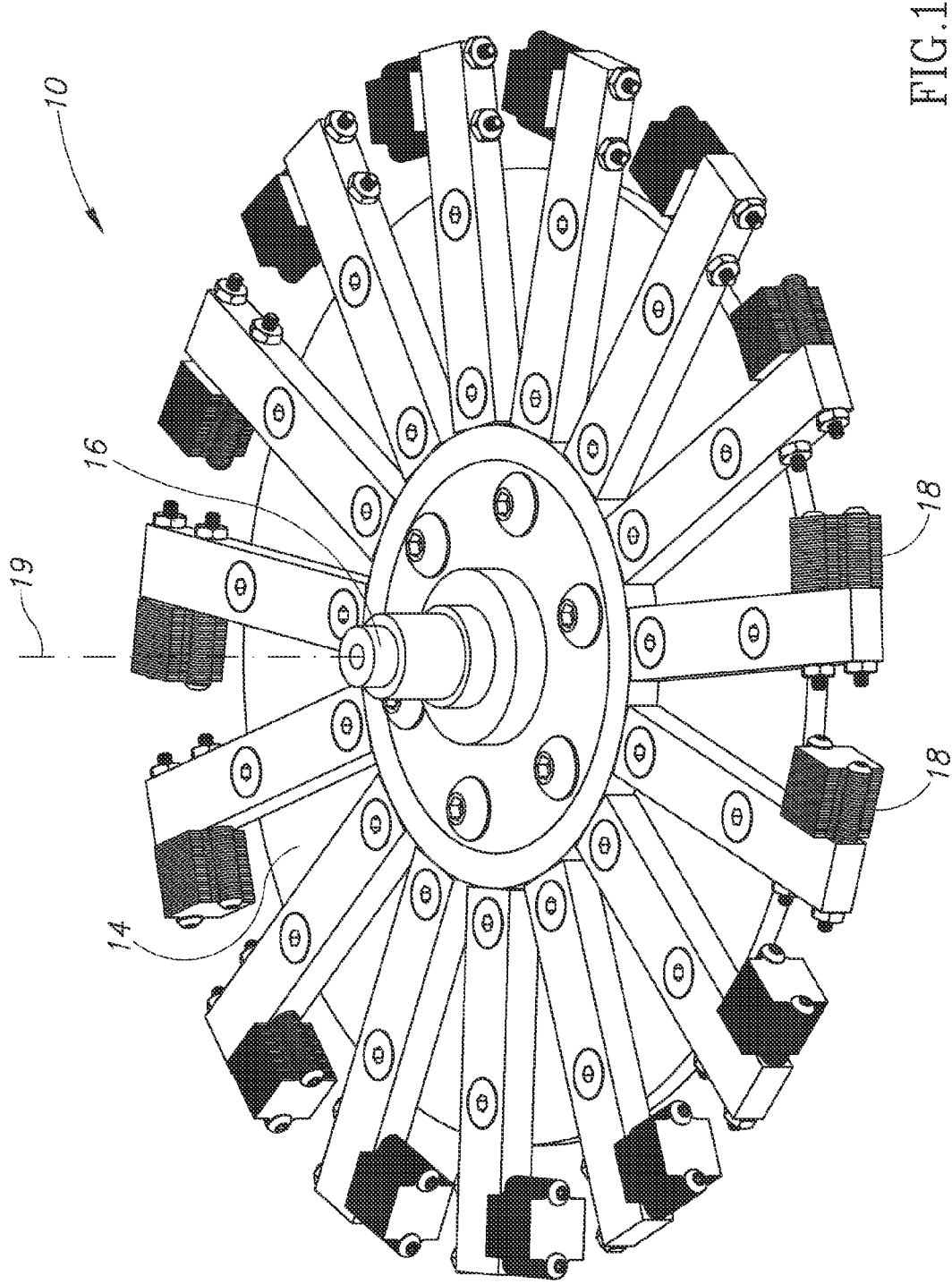
FIG. 1 illustrates a perspective view of a rotor of an electric motor.

Referring now to the drawings, FIG. 1 shows a rotor 10 of an electric motor 12. The rotor 10 is a moving component of the motor 12, whose rotary motion about a rotary axis provides requisite torque. The rotor 10 comprises a disk 14, a shaft 16 centrally disposed on a surface of the disk 14 and axially aligned with the disk and a plurality of rotor poles 18 circumferentially disposed about and on an outer periphery of the disk 14. The shaft 16 extends about an axis of rotation 19. Fifteen rotor poles 18 are shown in FIG. 1 to be equally spaced apart (i.e., with 24 degrees therebetween). However, various embodiments may be contemplated in which a different number of rotor poles 18 is used. The rotor poles 18 may be made of soft magnetic material having low coercivity, such as laminated silicon steel, whereby the soft magnetic material may be more easily magnetized and demagnetized than other types of material. A magnetic reluctance force is generated by the motor 12 to induce movement of the rotor 10. The magnetic reluctance force magnetizes the rotor poles 18 and attracts the rotor poles resulting in movement of the rotor poles (for example, in a direction that is substantially tangential to a circumference of the rotor 10). The movement results in supplying torque about a rotary axis of the shaft 16.

Figure 2:
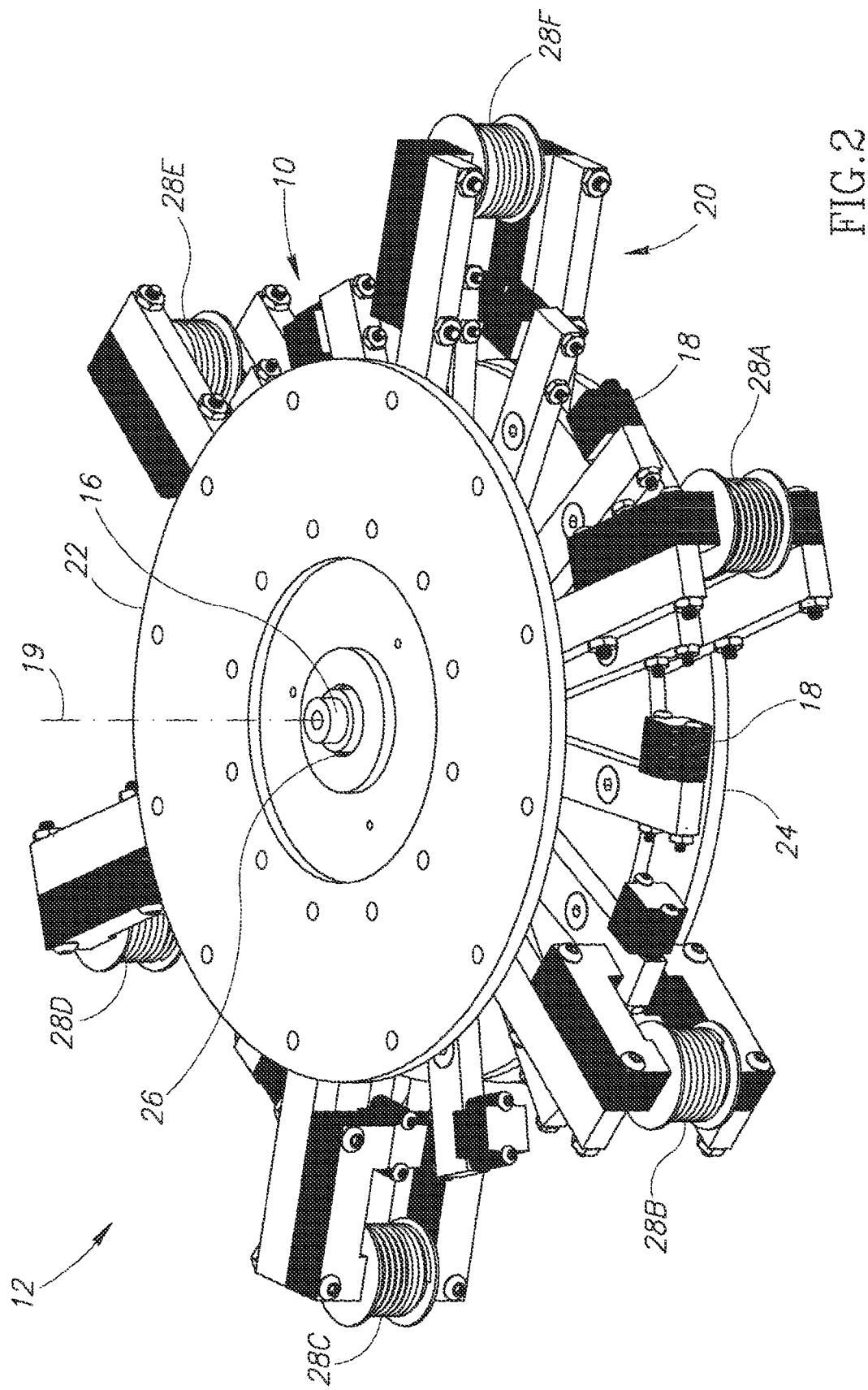
FIG. 2 illustrates a perspective view of the top of the rotor and a stator assembly of the electric motor.

As may be best viewed in FIG. 2, the motor 12 is shown having the rotor 10 and a stator 20 coaxially arranged. The stator 20 is configured with a first plate 22 and a second plate 24 that are separated by a gap allowing for the rotor disk 14 and the plurality of rotor poles 18 to be disposed in the gap and between the first and second plates 22, 24. Furthermore, the first plate 22 of the stator 20 is configured with an aperture 26 permitting passage of the rotor shaft 16. A plurality of stator poles (denoted as $28_{A-F}$ and collectively referred to herein by the numeral alone) are circumferentially disposed about and on an outer periphery of the stator 20 and are supported by plates 22, 24. The stator poles 28 may be disposed further radially outwardly from the rotor poles 18 about the rotary axis 19 of the rotor 10. Similar to the rotor poles 18, the stator poles 28 may be equally spaced apart with 60 degrees therebetween. Although six stator poles 28 are described herein, it may be recognized than another number of stator poles 28 may be used.

Figure 4:
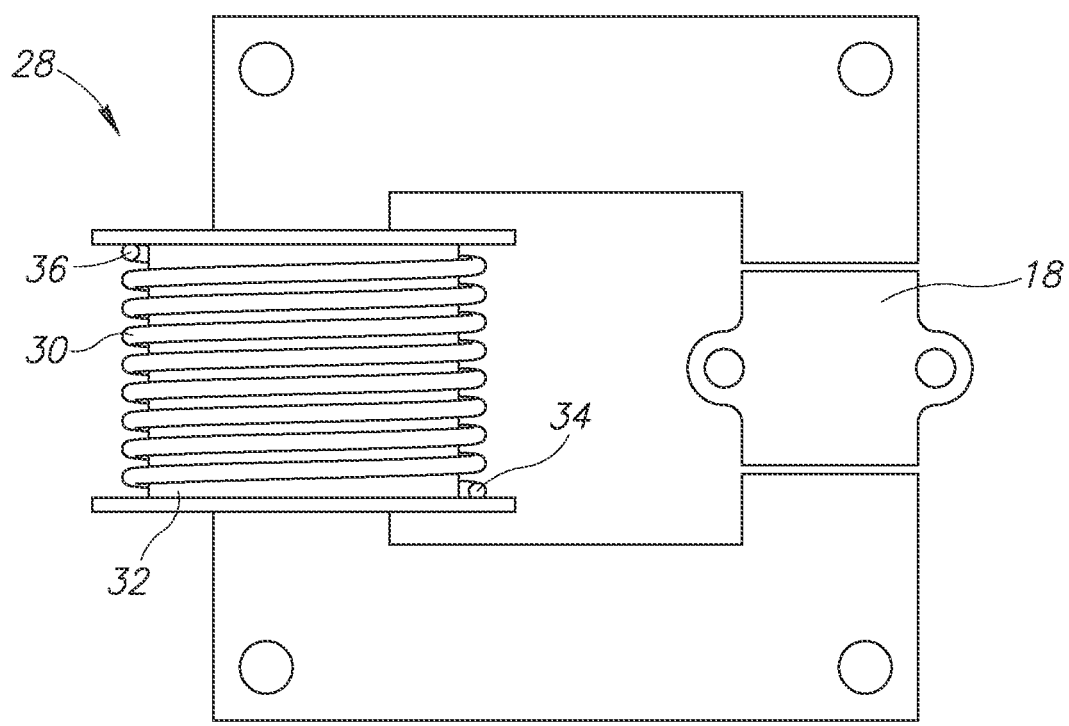
FIG. 4 illustrates a side elevation view of a stator pole of the electric motor.
Figure 5:
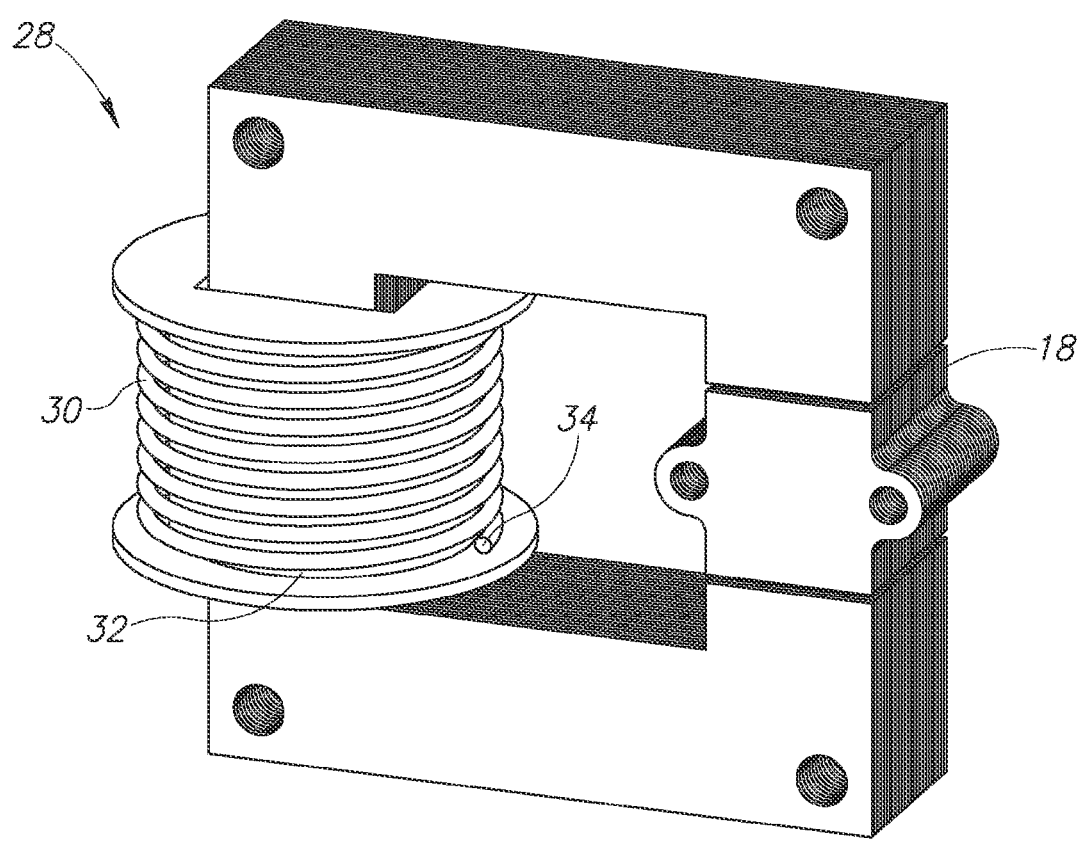
FIG. 5 illustrates a perspective view of the stator pole of the electric motor.

As may be best viewed in FIG. 4, a stator pole 28 comprises a coil 30, which may be made from an electrically conductive metal wire, such a copper wire. The coil 30 may be wound around a magnetically conductive core 32 such as a laminated iron core, among others. The coil 30 may have two wire endings (referred to herein a first coil wire ending 34 and a second coil wire ending 36), whereby passage of current through the coil 30 from the first coil wire ending 34 to the second coil wire ending 36 or vice-versa induces a magnetic field having a polarity. For example, the passage of current from first coil wire ending 34 to the second coil wire ending 36 energizes the stator pole 28 and creates a magnetic field having a South-North polarity through the core 32 about which the coil 30 is wound. The magnetic field is also created in proximity of the stator pole 28 acting on an "air gap" between the stator pole 28 and a nearby rotor pole 18 as well as the rotor pole 18. Ceasing the flow of current through the coil results in de-energizing the stator pole 28, whereby the magnetic field will be no longer induced.

As a result of inducing magnetic field, a magnetic reluctance force attempts to align the rotor pole 18 subjected to the magnetic field with a stator pole 28. The magnetic field results in magnetically polarizing the rotor pole 18. Further, the rotor pole 18 is attracted to the stator pole 28 thereby pulling the rotor pole 18 towards the stator pole 28 until the poles are aligned. The rotor pole and the stator pole are said to be aligned when continued energizing of the stator pole does not result in a force inducing continued movement of the rotor pole toward the stator pole and thereby continued rotary movement of the rotor 10. As may be viewed in FIG. 2, stator pole $28_A$ is aligned with a corresponding rotor pole 18. When the poles are aligned, continued energizing of the stator pole $28_A$ may not result in inducing the rotary motion of rotor 10 given the assembly of the motor 12. To accomplish continued rotary motion of the rotor 10, stator pole $28_A$ may be de-energized by ceasing the flow of current through its respective coil 30, and stator pole $28_F$ may be energized resulting in a magnetic reluctance force pulling an unaligned rotor pole 18 towards the stator pole $28_F$, thus ensuring continued rotary motion of the rotor 10.

Given the configuration of the motor 12 having six stator poles 28 and fifteen rotor poles 18, at a point in time a maximum number of three stator poles may each be aligned with a corresponding rotor pole. The remaining stator poles are unaligned with rotor poles but may energized to induce alignment and thus ensure continued rotary motion of the rotor 10. In a first mode of operation of the motor 12, a first subset of stator poles $28_{A,C,E}$ may be energized, whereas a second subset of stator poles $28_{B,D,F}$ may be de-energized. In a second mode of operation, the second subset of stator poles $28_{B,D,F}$ may be energized, whereas the first subset of stator poles $28_{A,C,E}$ may be de-energized. After energizing the first subset of stator poles $28_{A,C,E}$, a subset of rotor poles 18 may become aligned with the first subset of stator poles $28_{A,C,E}$ as shown in FIG. 2. When the poles become aligned or at a point typically before or after alignment, the first subset of stator poles $28_{A,C,E}$ may be de-energized and the second subset of stator poles $28_{B,D,F}$ may be energized.

Continued switching between the modes of operation results in continued rotary motion of the rotor 10. The switching may be performed before a subset of energized stator poles $28_{A,C,E}$, $28_{B,D,F}$ becomes aligned with a respective set of rotor poles 18 or when the poles become aligned. The switching sequence may be performed such that a magnetic field of a subset of energized stator poles $28_{A,C,E}$, $28_{B,D,F}$ "leads" the rotor poles 18 thereby pulling the rotor poles 18 to the stator pole 28 and ensuring continued rotary movement of the rotor 10. The timing of the switching and the relative position of the energized or de-energized stator poles 28 to the rotor poles 18 dictates the rate (for example, as measured in revolutions per unit time) at which the rotor 10 rotates and thus the torque developed by the shaft 16.

Figure 3:
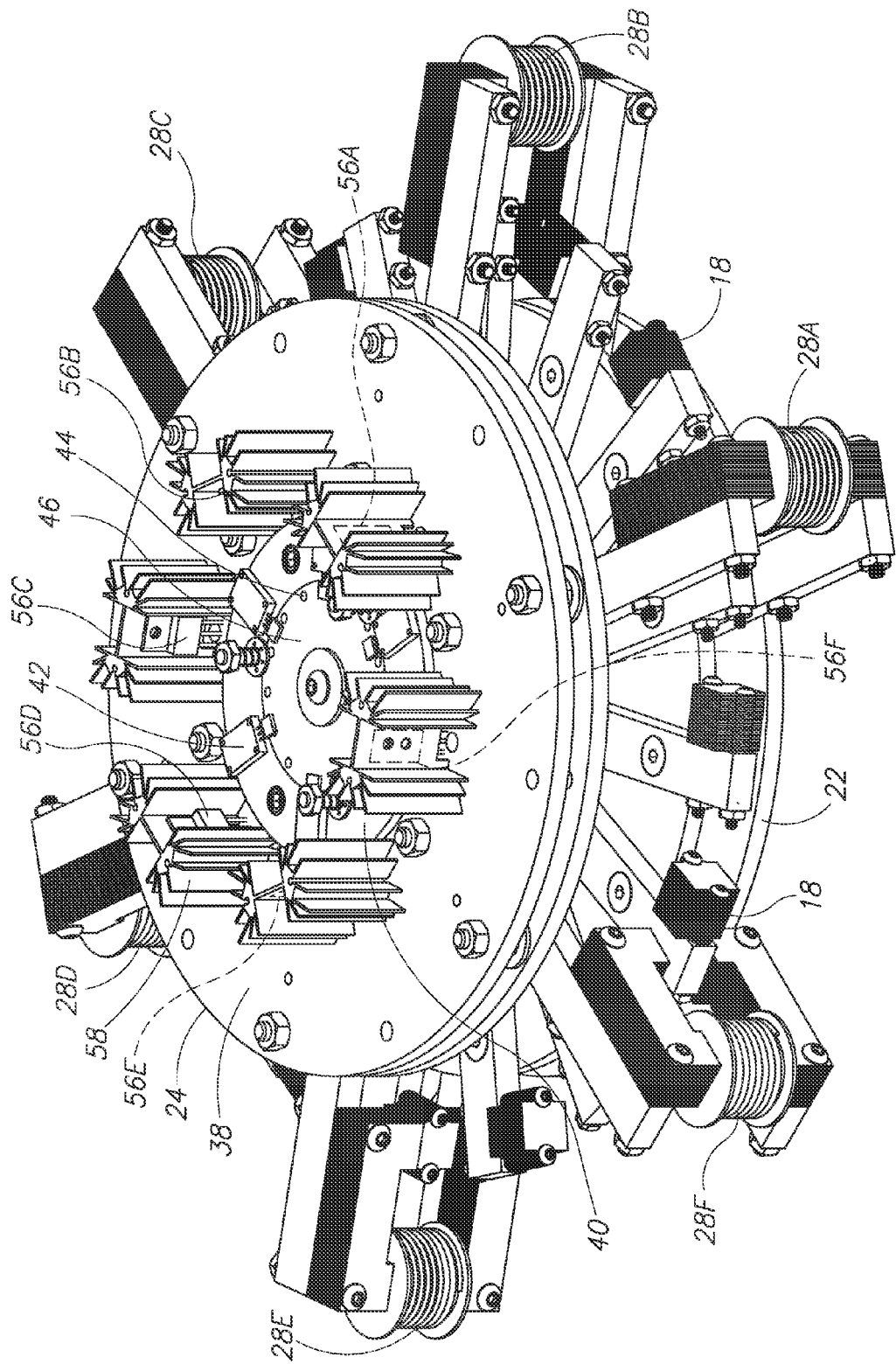
FIG. 3 illustrates a perspective view of the bottom of the rotor and the stator assembly of the electric motor.

A proximity sensing circuit 50, which will be described below, is used for determining the relative positions of the stator poles 28 to the rotor poles 18, whereby the relative positions are used for timing switching between the modes of operation. Referring now to FIG. 3, a perspective view of an exterior surface 38 of the second plate 24 of the stator 20 is shown. A ring 40 is mounted on the exterior surface of the second plate 24, and a plurality of Hall effect sensors 42 are positioned on the ring 40. The Hall effect sensors 42, which are proximity detection devices, are utilized to identify the positioning of the rotor poles 18 in relation to the stator poles 28. Furthermore, the positioning may be used to trigger switching between the modes of operation of the motor 12 and control the rotary motion of the rotor 10. It is noted that although Hall effect sensors 42 are used herein as positioning devices, various embodiments may be contemplated in which a different type of positioning device or object, motion or proximity detection device may alternatively be used.

The plurality of Hall effect sensors 42 may each produce a voltage output that is a function of the distance of a Hall effect sensor to a magnet. To identify the positioning of the rotor poles 18 with respect to the stator poles 28, a plurality of magnets 44 are mounted on the exterior sidewall of a cylinder 46 extending through the ring 40 and coaxial with the rotary axis 19. The cylinder 46 is coupled to a surface of the rotor disk 14, for example, opposite to that to which the shaft 16 is attached, and rotary movement of the rotor 10 results in a corresponding rotary movement of the cylinder 46.

Each of the plurality of Hall effect sensors 42 may be radially aligned with a corresponding one of the plurality of stator poles 28, whereby the radial alignment is with respect to the rotary axis 19 of the rotor. Furthermore, each of the plurality of magnets 44 may be radially aligned with a corresponding one of the plurality of rotor poles 18. Due to the arrangement of the Hall effect sensors 42 and the magnets 44, relative pole positions are determined using the arrangement. The relative positions of a stator pole 28 to a rotor pole 18 may be determined based at least in part on the voltage output of the corresponding Hall effect sensor 42 that is radially aligned with the stator pole. When the poles are aligned the voltage output of the Hall effect sensor 42 is at a maximum.

Figure 6:
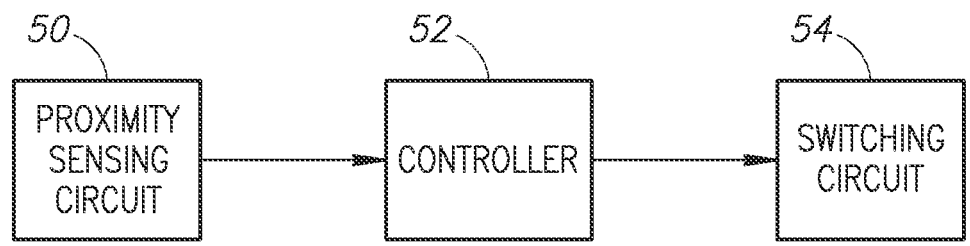
FIG. 6 illustrates a block diagram of a circuit for controlling the electric motor.

The plurality of Hall effect sensors 42 and the plurality of magnets 44 collectively form the proximity sensing circuit 50, as shown in FIG. 6. The output of the proximity sensing circuit comprising the voltage outputs of the Hall effect sensors 42 is provided to a controller 52. The controller 52 may utilize the voltage outputs to determine the relative positions of the rotor poles 18 and the stator poles 28 and may control the timing of the switching the energy of the coils 30 of the stator pole 28 based on the configured speed of the motor 12. The controller 52, which may be a microcontroller or microprocessor, among other types of digital controllers, may instruct a switching circuit 54 to switch between the modes of operation of the motor 12.

The switching circuit 54 is shown to be a plurality of transistors $56_{A-F}$ in FIG. 3. The plurality of transistors $56_{A-F}$ (which are collectively referred to herein by the numeral alone) may be metal-oxide-semiconductor field-effect transistors (MOSFETs) but in other embodiments any other type of electrical switch may alternatively be used. Each transistor 56 is mounted to a heat sink 58 that dissipates heat emitted by the transistor 56. Each transistor 56 may control the flow of current to a respective coil 30 of a stator pole 28. The transistor 56 may be serially connected to the stator pole 28 and may be used to permit current to flow through the coil 30 thus energizing the stator pole 28. Further, the transistor 56 may stop the flow of current through the coil 30 thus de-energizing the stator pole 28. For example, the gate of the transistor may be connected to an output port of the controller 52 and voltage supplied by the output port may be used to cause the transistor to operate as an open switch that prevents the flow of current or a closed switch that permits the flow of current. In the first mode of operation of the motor 12, a first subset of transistors $56_{A,C,E}$ corresponding to the first subset of stator poles $28_{A,C,E}$ may be supplied with a "high" voltage and may, thus, operate as closed switches that permit the flow of current and energize the first subset of stator poles $28_{A,C,E}$. Conversely, a second subset of transistors $56_{B,D,F}$ corresponding to the second subset of stator poles $28_{B,D,F}$ may be supplied with a "low" voltage and may, thus, operate as open switches that prevent the flow of current and de-energize the second subset of stator poles $28_{B,D,F}$.

Figure 7:
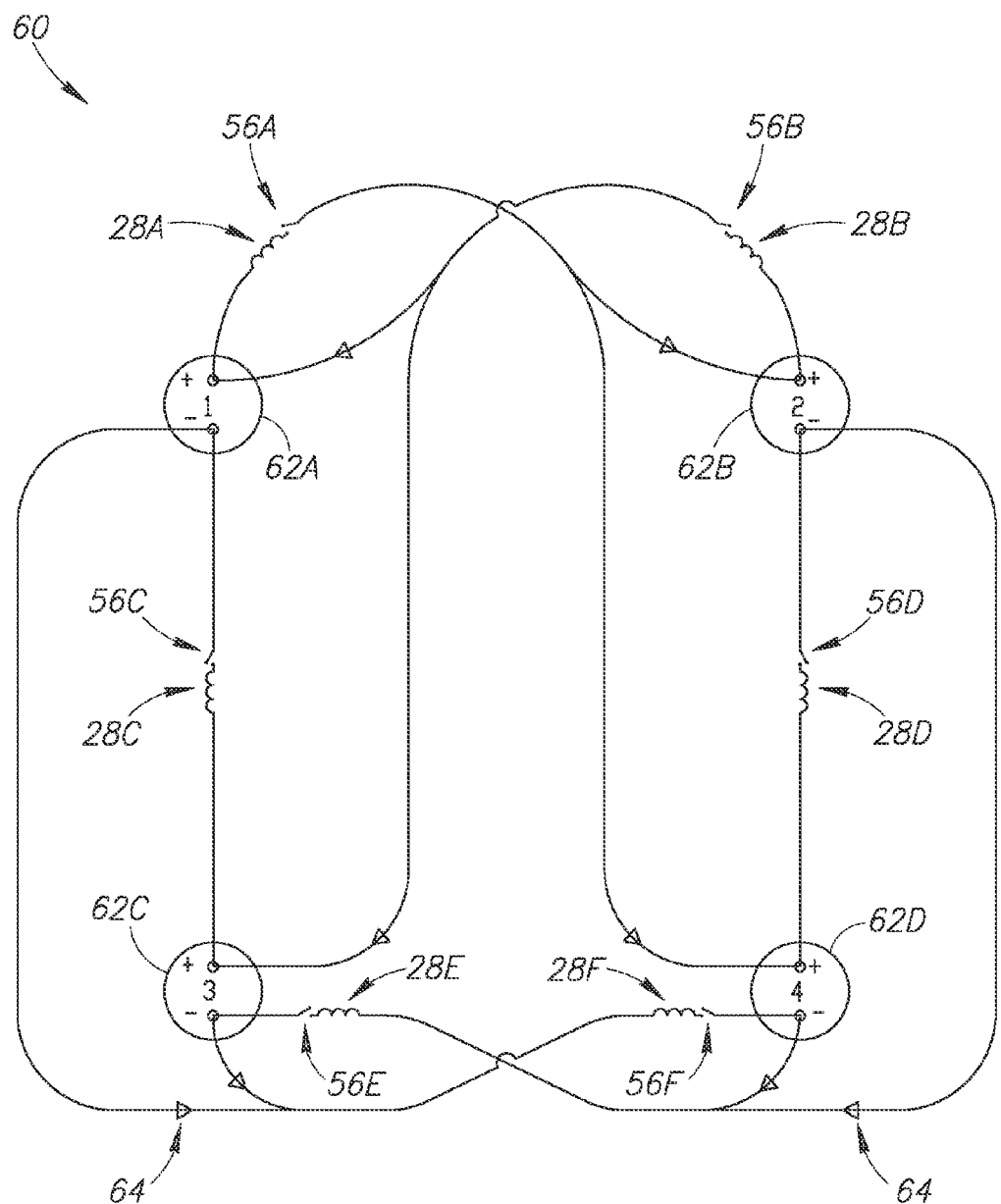
FIG. 7 illustrates a schematic of a circuit for powering the electric motor.

Making reference to FIG. 7, a schematic of a circuit 60 for powering the motor 12 is shown. The circuit 60 comprises a plurality of charge storage devices $62_{A-D}$, whereby the charge storage devices may be rechargeable batteries. The circuit 60 is configured such that in the first mode of operation a first subset of the charge storage devices $62_{A,C}$ discharges electric power to energize the first subset of the stator poles $28_{A,C,E}$. In the first mode of operation, a second subset of the charge storage devices $62_{B,D}$ receives a portion of the discharged power as return electric power. The received power is used to recharge the second subset of the charge storage devices $62_{B,D}$ and replenish any depleted charge of the second subset of the charge storage devices $62_{B,D}$. In a second mode of operation, the second subset of the charge storage devices $62_{B,D}$ discharges electric power to energize the second subset of the stator poles $28_{B,D,F}$. Similarly, the first subset of the charge storage devices $62_{A,C}$ receives a portion of the discharged power as return electric power. The switching circuit 54 described herein as comprising a plurality of transistors $56_{A-F}$ is used to switch between the modes of operation. A plurality of diodes 64 are also used to control the directionality of current flow in the circuit 60.

In either mode of operation, the subset of transistors 56 corresponding to the subset of stator poles 28 that is not energized open the path in the circuit 60 supplying current to each stator pole that is a member of that subset. Opening the path prevents the flow of current in the coil of the stator pole 28.

Figure 8:
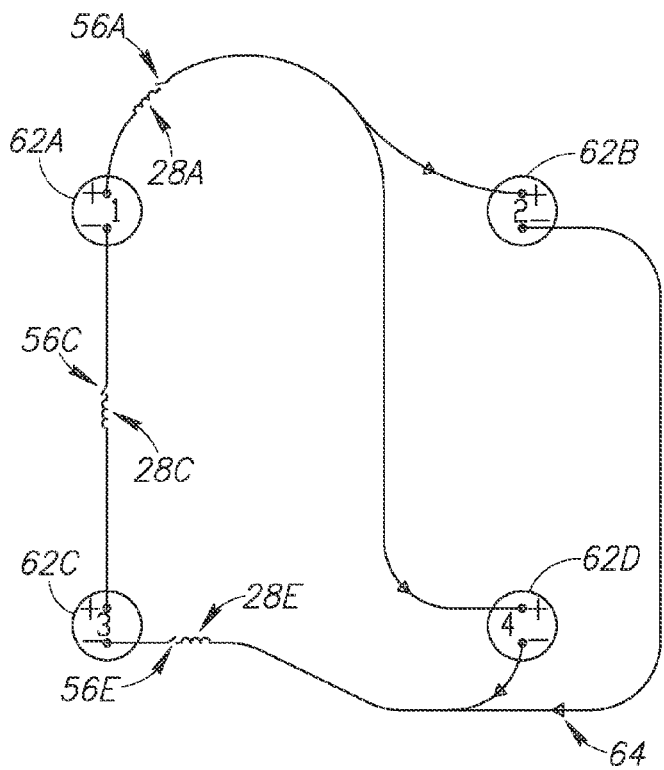
FIG. 8 illustrates a schematic of the circuit for powering the electric motor in a first mode of operation of the motor.

Referring to FIG. 8, the circuit 60 is shown in the first mode of operation, where the first subset of stator poles $28_{A,C,E}$ are energized due to the passage of current through their respective coils 30. Furthermore, the second subset of stator poles $28_{B,D,F}$ are not energized and thus resulting in blocking the flow of current in their respective paths. In the first mode of operation, charge storage devices $62_{A,C}$ discharge in series to energize the first subset of stator poles $28_{A,C,E}$. Furthermore, charge storage devices $62_{B,D}$ are being charged in parallel from a returned portion of the discharge. When the charge storage devices $62_{A-D}$ are equally rated (for example, 12 volt rechargeable batteries), series discharging and parallel charging results in the charge storage devices $62_{B,D}$ being charged with a voltage that is twice their rated voltage. Parallel charging more efficiently distributes the returned portion of the discharge among the charge storage devices $62_{B,D}$ than series charging.

Figure 9:
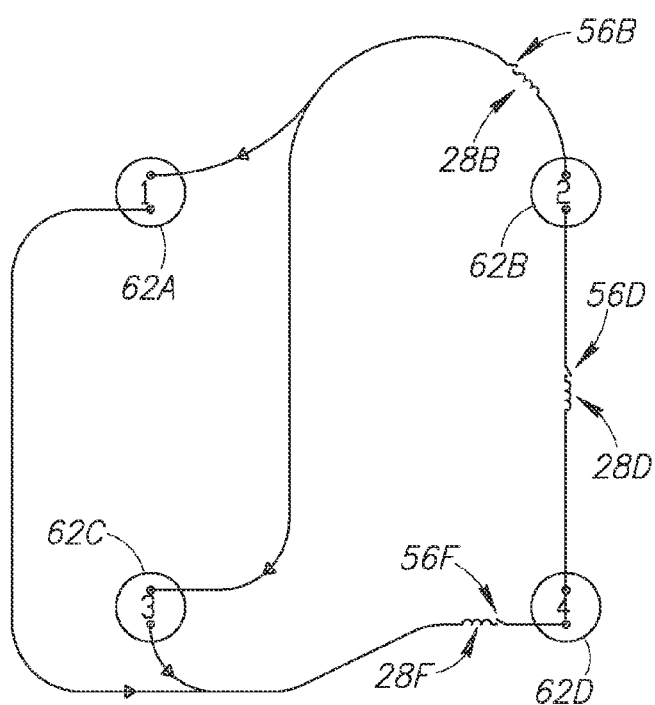
FIG. 9 illustrates a schematic of the circuit for powering the electric motor in a second mode of operation of the motor.

Similarly, as may be best viewed in FIG. 9, in the second mode of operation, the second subset of the charge storage devices $62_{B,D}$ are discharging in series thus resulting in powering the motor with a voltage that is twice their rated voltage. The first subset of the charge storage devices $62_{A,C}$ are charged in parallel using returned electric power. Using the returned electric power to recharge either subset of charge storage devices $62_{B,D}$, $62_{A,C}$ result in efficient utilization of the charge of the circuit 60, whereby excess electric power is returned back for replenishing discharged charge storage devices $62_{B,D}$, $62_{A,C}$.

At a high shaft rotational speeds (which also corresponds to higher electrical switching frequencies), the power is returned to the charge storage devices connected in parallel (i.e., the second subset of the charge storage devices $62_{B,D}$ in the first mode of operation or first subset of the charge storage devices $62_{A,C}$ in the second mode of operation) during relatively brief intervals of time (for example, in tenths of milliseconds). Although the time the storage devices are operating does not change, the instantaneous time interval of either charging or discharging is further reduced as the frequency of switching increases. As a result of this reduced instantaneous load time, the motor 12 is operated at higher average voltages. Further, charging a battery for a brief interval of time (also, known as pulse charging) is advantageous to a battery. In certain types of devices, such as lead-acid batteries, the instantaneous voltage dissolves lead-sulfate crystals resulting in extending the life cycle of the battery. At a high frequency, the draw on the storage devices is reduced requiring less capacity from the storage devices.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A motor comprising:
   a rotor comprising a plurality of rotor poles;
   a stator comprising a plurality of stator poles, a first subset of the plurality of stator poles being energized during a first mode of operation of the motor and a second subset of the plurality of stator poles being energized during a second mode of operation of the motor;
   a powering circuit comprising a plurality of charge storage devices, in the first mode of operation the powering circuit being operable to discharge a first subset of the plurality of charge storage devices to energize the first subset of the plurality of stator poles, with the first subset of the plurality of charge storage devices being discharged in series, and the powering circuit being further operable to charge a second subset of the plurality of charge storage devices while connected in parallel using at least a portion of the discharge of the first subset of the plurality of charge storage devices, and in the second mode of operation the powering circuit being operable to discharge the second subset of the plurality of charge storage devices to energize the second subset of the plurality of stator poles, with the second subset of the plurality of charge storage devices being discharged in series, and the powering circuit being further operable to charge the first subset of the plurality of charge storage devices while connected in parallel using at least a portion of the discharge of the second subset of the plurality of charge storage devices; and a proximity sensing circuit operable to detect a relative position of a rotor pole of the plurality of rotor poles to a stator pole of the plurality of stator poles, wherein the powering circuit comprises a switching circuit and a controller, the controller configured to receive an indication of the relative position from the proximity sensing circuit and determine based on the position whether to operate the motor in the first mode of operation or the second mode of operation, when the motor is to be operated in the first mode of operation, the controller is operable to send to a first signal to the switching circuit to energize the first subset of the plurality of stator poles, and when the motor is to be operated in the second mode of operation, the controller is operable to send to a second signal to the switching circuit to energize the second subset of the plurality of stator poles.

2. The motor of claim 1, wherein the rotor further comprises a shaft and the plurality of rotor poles are circumferentially disposed on the rotor about an axis of rotation of the shaft.

3. The motor of claim 2, wherein the rotor and the stator are coaxially arranged and the plurality of stator poles are circumferentially disposed on the stator about the axis of rotation of the shaft.

4. The motor of claim 1, wherein in response to the controller sending the first signal to the switching circuit, the switching circuit is operable to de-energize the second subset of the plurality of stator poles, and wherein in response to the controller sending the second signal to the switching circuit, the switching circuit is operable to de-energize the first subset of the plurality of stator poles.

5. The motor of claim 1, further comprising:
each of the stators of the first subset of the plurality of stator poles having a coil and forming a first subset of coils and each of the stators of the second subset of the plurality of stator poles having a coil and forming a second subset of coils, and the switching circuit being operable to, in response to receipt of the first signal, energize the first subset of coils, and the switching circuit being operable to, in response to receipt of the second signal, energize the second subset of the plurality of stator poles by permitting a flow of current to the second subset of coils.

6. The motor of claim 5, further comprising the switching circuit being operable to, in response to receipt of the first signal, de-energize the second subset of the plurality of stator poles by preventing the flow of current to the second subset of coils, and the switching circuit being operable to, in response to receipt of the second signal, de-energize the first subset of the plurality of stator poles by preventing the flow of current to the second subset of coils.

7. An electric motor comprising:
a stator comprising a first set of stator poles and a second set of stator poles, each of the first and second sets of stator poles comprising a plurality of stator poles, wherein the first set of stator poles and the second set of stator poles being comprised of different sets of stator poles;

a circuit comprising a first set of charge storage devices and a second set of charge storage devices, the first set of charge storage devices and the second set of charge storage devices being comprised of different sets of charge storage devices, wherein the circuit is operable to supply electric current to the first set of stator poles from the first set of charge storage devices in a first mode of operation of the electric motor, the first set of charge storage devices being connected in series in the first mode of operation, and the circuit is operable to supply electric current to the second set of charge storage devices in the first mode of operation, the second set of charge storage devices being connected in parallel in the first mode of operation, and wherein the circuit is operable to supply electric current to the second set of stator poles from the second set of charge storage devices in a second mode of operation of the electric motor, the second set of charge storage devices being connected in series in the second mode of operation, and the circuit is operable to supply electric current to the first set of charge storage devices in the second mode of operation, the first set of charge storage devices being connected in parallel in the second mode of operation;

a rotor comprising a shaft and a plurality of rotor poles disposed about an axis of rotation of the shaft; and a proximity sensing circuit configured to detect a proximity of one of the stator poles of the first set of stator poles or of the second set of stator poles to at least one rotor pole of the plurality of rotor poles.

8. The electric motor of claim 7, wherein circuit is further operable to prevent supplying the electric current to the second set of stator poles in the first mode of operation and prevent supplying the electric current to the first set of stator poles in the second mode of operation.

9. The electric motor of claim 7, wherein each of the first and second sets of stator poles comprises a plurality of stator poles, wherein the supplying of electric current to one of the stator poles of the first set of stator poles or of the second set of stator poles induces a magnetic field in a proximity of the stator pole.

10. The electric motor of claim 9, wherein a reluctance force of the magnetic field attracts at least one rotor pole of the plurality of rotor poles to the stator pole to which the electric current is being supplied, resulting in rotary motion of the rotor and supply of torque to the shaft.

11. The electric motor of claim 7, further comprising:
a controller configured to receive an indication of the proximity of the one stator pole to the at least one rotor pole and determine based on the proximity whether the electric motor is to be operated in accordance with the first mode of operation or the second mode of operation.

12. The electric motor of claim 11, wherein the controller is configured to, on a condition that the electric motor is to be operated in accordance with the first mode of operation, send a first signal to a first set of transistors of the circuit to permit the supply of electric current to the first set of stator poles and a second signal to a second set of transistors of the circuit to prevent the supply of electric current to the second set of stator poles.

13. The electric motor of claim 11, wherein the controller is configured to, on a condition that the electric motor is to be operated in accordance with the second mode of operation, send a third signal to the second set of transistors operable to permit the supply of electric current to the second set of stator poles and a fourth signal to the first set of transistors to prevent the supply of electric current to the first set of stator poles.

14. The electric motor of claim 11, wherein the controller is configured to, on a condition that the electric motor is to be operated in accordance with the second mode of operation, send a first signal to a first set of transistors of the circuit to prevent the supply of electric current to the first set of stator poles and a second signal to a second set of transistors of the circuit to permit the supply of electric current to the second set of stator poles.

15. A motor comprising:
a rotor comprising a shaft and a plurality of rotor poles circumferentially disposed about a rotational axis of the shaft;
a stator positioned to interact with the rotor to cause selective rotation of the rotor, the stator comprising a plurality of stator poles circumferentially disposed about the rotational axis of the shaft, wherein a first one of the stator poles of the plurality of stator poles is operable to attract a first one of the rotor poles of the plurality of rotor poles to rotate the rotor when the first one of the stator poles is energized and a second one of the stator poles of the plurality of stator poles is operable to attract a second one of the rotor poles of the plurality of rotor poles when the second one of the stator poles is energized;
a circuit comprising a plurality of charge storage devices, the plurality of charge storage devices including a first subset of charge storage devices and a second subset of charge storage devices, wherein, in a first mode of operation, the circuit is operable to discharge the first subset of charge storage devices to both energize the first one of the stator poles and charge the second subset of charge storage devices, with the first subset of charge storage devices being connected in series and the second subset of charge storage devices being connected in parallel, and wherein, in a second mode of operation, the circuit is operable to discharge the second subset of charge storage devices to both energize the second one of the stator poles and charge the first subset of the charge storage devices, with the second subset of charge storage devices being connected in series and the first subset of the charge storage devices being connected in parallel;
a proximity sensing circuit configured to detect a proximity of one of the stator poles of the plurality of stator poles to at least one of the rotor poles of the plurality of rotor poles; and
a controller configured to receive an indication of the proximity from the proximity sensing circuit, and determine whether to operate the circuit in the first mode of operation or the second mode of operation based on the indication of the proximity.

* * * * *